(12) United States Patent
Rao

(10) Patent No.: US 12,183,270 B1
(45) Date of Patent: Dec. 31, 2024

(54) DIGITAL DISPLAYS OF ADVERTISEMENTS ON VEHICLES AND SELF DRIVING VEHICLES

(71) Applicant: Sanjay K. Rao, Palo Alto, CA (US)

(72) Inventor: Sanjay K. Rao, Palo Alto, CA (US)

(73) Assignee: Accelerate Labs LLC, Palo Alto, CA (US)

( * ) Notice: Subject to any disclaimer, the term of this patent is extended or adjusted under 35 U.S.C. 154(b) by 0 days.

(21) Appl. No.: 16/720,897

(22) Filed: Dec. 19, 2019

Related U.S. Application Data

(63) Continuation of application No. 15/928,086, filed on Mar. 21, 2018, now Pat. No. 10,665,155.

(60) Provisional application No. 62/474,889, filed on Mar. 22, 2017.

(51) Int. Cl.
| | |
|---|---|
| *G09G 3/3208* | (2016.01) |
| *G06Q 30/0242* | (2023.01) |
| *G06Q 30/0251* | (2023.01) |
| *G09F 21/04* | (2006.01) |
| *B60J 1/08* | (2006.01) |
| *G06F 3/0488* | (2022.01) |

(52) U.S. Cl.
CPC ....... *G09G 3/3208* (2013.01); *G06Q 30/0242* (2013.01); *G06Q 30/0265* (2013.01); *G09F 21/04* (2013.01); *B60J 1/08* (2013.01); *G06F 3/0488* (2013.01); *G09G 2320/0653* (2013.01); *G09G 2340/12* (2013.01)

(58) Field of Classification Search
CPC ......... G09G 3/3208; G09G 2320/0653; G09G 2340/12; G06Q 30/0242; G06Q 30/0265; G09F 21/04; B60J 1/08; G06F 3/0488

USPC ......................................................... 345/592
See application file for complete search history.

(56) References Cited

U.S. PATENT DOCUMENTS

| | | | | |
|---|---|---|---|---|
| 8,719,094 B1* | 5/2014 | Klein | ................ | G01C 21/3697 |
| | | | | 705/14.25 |
| 10,319,272 B1* | 6/2019 | Carter | .................... | G06F 3/012 |
| 2010/0179878 A1* | 7/2010 | Dawson | ................ | G06Q 30/00 |
| | | | | 705/14.62 |
| 2011/0093193 A1* | 4/2011 | Huang | .................. | G06Q 50/01 |
| | | | | 701/408 |
| 2013/0041761 A1* | 2/2013 | Voda | .................. | G06Q 30/0259 |
| | | | | 705/14.68 |
| 2013/0103307 A1* | 4/2013 | Sartipi | ................. | H04W 4/021 |
| | | | | 701/465 |

(Continued)

*Primary Examiner* — Jin Ge

(57) ABSTRACT

Windows including sunroofs of a car may be enabled to display cinematic video, still pictures, opaque content, or picturesque content such as the countryside to simulate various environments while driving. On the outside of the autonomous vehicle advertising content may be shown on digital displays to pedestrians, bystanders, and other vehicle, autonomous vehicle or semi-autonomous vehicle passengers. Advertising revenue may offset vehicle leasing, maintenance, fuel, and ridesharing costs. Ad networks may send local offers content for presentation on the vehicle, autonomous vehicle or semi-autonomous vehicle's windows. Passengers may order food and interact with ads on the car window. The car windows may be multi-touch enabled to allow for various gestures and interactivity with the vehicle, autonomous vehicle or semi-autonomous vehicle. A ridesharing program may allow a passenger to enable ads on the window of the car during their trip to defray the cost of the trip.

14 Claims, 12 Drawing Sheets

Dual Vehicle Communication Ad Network

(56) References Cited

U.S. PATENT DOCUMENTS

| | | | | |
|---|---|---|---|---|
| 2013/0304565 A1* | 11/2013 | Saccoman | ............... | G06Q 30/00 705/14.41 |
| 2015/0186984 A1* | 7/2015 | Loganathan | ....... | G06Q 30/0641 705/27.1 |
| 2015/0220991 A1* | 8/2015 | Butts | .................. | G06Q 30/0265 705/14.62 |
| 2015/0261219 A1* | 9/2015 | Cuddihy | .................... | B60J 3/04 701/23 |
| 2015/0310379 A1* | 10/2015 | Farrelly | ............ | G06Q 30/0203 705/7.15 |
| 2015/0348112 A1* | 12/2015 | Ramanujam | ....... | G06Q 30/0266 705/14.63 |
| 2016/0328745 A1* | 11/2016 | Martin | ................ | G06Q 30/0257 |
| 2016/0364678 A1* | 12/2016 | Cao | ...................... | G06Q 10/083 |
| 2017/0309072 A1* | 10/2017 | Li | ......................... | H04L 67/306 |
| 2018/0007414 A1* | 1/2018 | Li | .................... | H04N 21/44222 |
| 2018/0014182 A1* | 1/2018 | Jaegal | .................... | B60K 35/00 |
| 2018/0088887 A1* | 3/2018 | LeBlanc | ............. | B60R 11/0235 |
| 2018/0137593 A1* | 5/2018 | Djuric | .................... | G06Q 50/30 |
| 2018/0374126 A1* | 12/2018 | Patil | ...................... | G01S 5/0027 |

\* cited by examiner

Interaction on Vehicle Smart Windows

Multiple Cinematic Video Content on Moving Object's Windows

Swivel chairs allow for positioning to face window

DIGITAL DISPLAYS OF ADVERTISEMENTS ON VEHICLES AND SELF DRIVING VEHICLES

CROSS REFERENCE TO RELATED APPLICATIONS

This application is a continuation of U.S. patent application Ser. No. 15/928,086, filed on Mar. 21, 2018, which claims the benefit of U.S. Provisional Patent Application Ser. No. 62/474,889 filed on Mar. 22, 2017, each of which is incorporated herein by reference in its entirety.

BACKGROUND

There is a large amount of time spent in vehicles and on roads. Increasingly with autonomous vehicles and ride sharing networks, passengers are enabled with greater freedom and time to engage in non-driving activities. The technical field herein relates to vehicle, autonomous vehicle or semi-autonomous vehicle entertainment and advertising systems both inside and outside the vehicle, autonomous vehicle or semi-autonomous vehicle.

SUMMARY

The summary contained herein reflects some of the aspects of the present disclosure. The disclosure as a whole should be considered to appropriately identify the scope and aspects of the elements of this disclosure.

This disclosure relates to the use of various surfaces, such as the glass windows of a car, for media and advertising interactivity.

This disclosure is concerned with enabling car and other vehicle, autonomous vehicle or semi-autonomous vehicles to display video, pictures, and multimedia content on the window surface itself. In some variations, the windows and sunroof within a vehicle, autonomous vehicle or semi-autonomous vehicle, autonomous vehicle, autonomous vehicle or semi-autonomous vehicle or semi-autonomous vehicle, autonomous vehicle or semi-autonomous vehicle may display multimedia content such as pictures, videos, and advertisements tailored to the individuals inside the car. In some embodiments, the windows may be enabled as interactive smart windows with touch screen capabilities. Certain manufactures may integrate the smart window into the vehicle, autonomous vehicle or semi-autonomous vehicle, autonomous vehicle, autonomous vehicle or semi-autonomous vehicle or semi-autonomous vehicle, autonomous vehicle or semi-autonomous vehicle itself. In other variations, the smart window may be pasted onto the existing windows using technology with LCD, LED, or OLED screens. After market smart windows may enable the broad use of existing cars to join a mobile vehicle, autonomous vehicle or semi-autonomous vehicle, autonomous vehicle, autonomous vehicle or semi-autonomous vehicle or semi-autonomous vehicle, autonomous vehicle or semi-autonomous vehicle ad network. In various instances, it is anticipated that manufacturers may enable a financing option for their vehicles such that those vehicles equipped with a smart window ad network can use the advertising dollars to defray the vehicle, autonomous vehicle or semi-autonomous vehicle financing, leasing, or fuel costs.

In other variations, the outside of the vehicle, autonomous vehicle or semi-autonomous vehicle including the windows of the car may additionally be enabled with advertisements and media content to allow for dynamic vehicle, autonomous vehicle or semi-autonomous vehicle driving billboards. The vehicles, autonomous vehicles or semi-autonomous vehicles may be linked to one another to allow for unified advertising across vehicles, autonomous vehicles or semi-autonomous vehicles such as on a freeway, conference, or a local geographical area. In some instances, vehicles, autonomous vehicles or semi-autonomous vehicles may audit each other so as to determine the effectiveness of the advertising campaign including the number of cars that are exposed to an outside vehicle, autonomous vehicle or semi-autonomous vehicle window.

The disclosure further has applicability to various devices including autonomous vehicles, autonomous vehicles or semi-autonomous vehicles programs and ride sharing programs. This disclosure provides for a system to enable entertainment and advertising within, outside, pertaining, and related to vehicles, autonomous vehicles or semi-autonomous vehicles, droves, trains, planes, moving electronic objects, and related items.

It is an aspect of the present disclosure to enable a distributed entertainment and advertising network based on vehicles including cars, trucks, vans, drones, UAVs, flying cars, flying drones, including autonomous or self-driven vehicles.

It is an aspect of the present disclosure to enable various software to be implemented in a non-transitory computer readable medium stored in a memory. The electronic devices include those that are further comprising of a processor, multiple processors, graphics cards, graphics chips, compute servers, computer memory systems, cloud connected streaming services, cloud connected infrastructure.

Video and Multi-Touch Windows on the Car

It is an aspect of the present disclosure to enable the windows of the car to be a multi-touch surface. The surface of each window may be individually used or be used in unison with the other windows on the car. Each window face may be enabled with multiple surfaces above a glass material. Alternatively, other materials may be used including plastic.

Various Smart Windows and Smart Glass surfaces may be enabled in the car to allow for touch enabled displays or non-touch enabled displays to be placed on the windows of the vehicle, autonomous vehicle or semi-autonomous vehicle.

The displays may be HD, Ultra HD, HDR capable, with various nits of brightness. The displays may be LCD, LED, OLED, AMOLED, or other formats. Displays may be multi-touch or controlled from paired wearable or mobile devices.

Connectivity and Mesh Networks for Multimedia Experiences on Vehicle, Autonomous Vehicle or Semi-Autonomous Vehicle Windows The smart windows may be enabled with connectivity via various wireless transmit and receive processors and communication units for connectivity to other vehicles, autonomous vehicles or semi-autonomous vehicles, cellular networks, WiFi Networks, Bluetooth networks, millimeter wavelength protocols, and other wired and wireless communication methods. Various aspects in this disclosure include the ability to process signals, communication signals, and other data processing locally or in the cloud.

In an aspect of the disclosure, there is a local computing unit including a computer or server contained within the vehicle, autonomous vehicle or semi-autonomous vehicle or the use of one or more mobile devices.

A vehicle, autonomous vehicle or semi-autonomous vehicle itself may be enabled with one or more wireless transmit and receive units. These units may be enabled to be paired directly with a specific window of the vehicle, autonomous vehicle or semi-autonomous vehicle. These can be identified as the front windshield, left mirror, right mirror, passenger front window, and so forth. A mobile device such as a cellular telephone can be paired with a window of the vehicle, autonomous vehicle or semi-autonomous vehicle to stream content or to send content from the mobile device to the window.

In yet another embodiment, a mobile device may connect to the server and the central command infrastructure for the vehicle, autonomous vehicle or semi-autonomous vehicle. The vehicle, autonomous vehicle or semi-autonomous vehicle media system can then coordinate the content to be sent to the windows of the mobile device.

It is an aspect of the present disclosure to have a media streaming and central compute device such as a server or a computer that leverages the capability of multiple devices. In this instance, a plurality of devices may be enabled to act in unison to download content and stream said content to a local display.

The smart window may make use of an Organic Light Emitting Diode (OLED) or LCD like interface. In these instances, an OLED may be enabled to be stuck on the windows of a vehicle, autonomous vehicle or semi-autonomous vehicle in a standardized format or a custom format. The connectivity from the stick-on OLED display may include a connectivity wire that connects to electronics housed in a strip at the base of the pasted OLED display. In other instances, an LCD panel may be used as part of the display integrated into the vehicle, autonomous vehicle or semi-autonomous vehicle window from the manufacturer. That is in one embodiment, the vehicle, autonomous vehicle or semi-autonomous vehicle may be enabled with smart windows and display directly from the manufacturer and in other embodiments the smart windows and display may be integrated as part of an aftermarket solution.

It is an aspect of the smart windows that they may be connected via a wired or wireless communication method from the window to a mobile device or a vehicle, autonomous vehicle or semi-autonomous vehicle central entertainment hub. In the wired instance a USB, USB 2.0, USB-C, micro-USB Ethernet, or other dongle may be available from the central vehicle, autonomous vehicle or semi-autonomous vehicle entertainment area or form one or more mobile devices, wearable devices, cellular telephones other electronic devices, local or network servers.

It is an aspect of the present disclosure to enable front and back facing smart windows. In this instance two separate panels may be placed using an adhesive or other mechanism on a window or dual panel smart windows may be included directly from the manufacturer.

It is an aspect of the present disclosure to enable various advertisements to be displayed on the windows of the vehicle, autonomous vehicle or semi-autonomous vehicle. In this embodiment, the advertisement may be personalized based on various criteria including the people within the car, the location, the vehicle, autonomous vehicle or semi-autonomous vehicle type, to starting point, the destination point, the local companies close by, among other factors.

In yet another variation, the advertisements and media may be displayed on the outside of the window. In this instance, the advertisements may make the vehicle, autonomous vehicle or semi-autonomous vehicle a billboard advertisements for one or more brands, products, or services. The ad units may be purchased on a specific window basis, on all the windows of a car, or all the vehicles, autonomous vehicles or semi-autonomous vehicles within a region. An ad server or a plurality of ad servers or ad networks may track the audience in the vehicles, autonomous vehicles or semi-autonomous vehicles and deliver targeted ads from a first vehicle, autonomous vehicle or semi-autonomous vehicle to a second vehicle, autonomous vehicle or semi-autonomous vehicle based on the location and trajectory of the first and second vehicle, autonomous vehicle or semi-autonomous vehicle. That is a certain customer or segment of customers is in vehicle, autonomous vehicle or semi-autonomous vehicle 1 and that vehicle, autonomous vehicle or semi-autonomous vehicle is in the proximity of a vehicle, autonomous vehicle or semi-autonomous vehicle 2, wherein proximity may be determined by location, GPS, sound, millimeter wave length or another format, then the ads of vehicle, autonomous vehicle or semi-autonomous vehicle 2 may be displayed on vehicle, autonomous vehicle or semi-autonomous vehicle 2's windows such that they are viewable from vehicle, autonomous vehicle or semi-autonomous vehicle 1.

In this instance, the auditing of the advertisements provides a view as to what the passengers of vehicle, autonomous vehicle or semi-autonomous vehicle 1 viewed. The auditing may be enabled by mapping the location time between vehicle, autonomous vehicle or semi-autonomous vehicle 1 and vehicle, autonomous vehicle or semi-autonomous vehicle 2 and the amount of time they are in the viewable distance of each other. In this instance the viewing area may be defined as the peripheral and central vision of a passenger in a given window of a vehicle, autonomous vehicle or semi-autonomous vehicle 1 against the advertising side and window of vehicle, autonomous vehicle or semi-autonomous vehicle 2. This may be determined from the vehicle, autonomous vehicle or semi-autonomous vehicle itself as the vehicles may be in direct communication with each other view millimeter wavelength communication, Bluetooth, WiFi, or other communication protocols. It may alternatively be enabled by the presence of traffic cameras or other fixed and moveable position cameras on the vehicles, autonomous vehicles or semi-autonomous vehicles themselves, streetlights, lamp posts.

It is an aspect of the present disclosure to enable a display such that the inside display may include a picture of the outside of the car using a camera affixed to the smart window or from the top of the vehicle, autonomous vehicle or semi-autonomous vehicle such that the inside passenger is not readily cognizant of the advertisement available on the outside of the vehicle, autonomous vehicle or semi-autonomous vehicle. Alternatively, a passenger in the seat may be enabled to use a mobile device, a wearable device, a button on the door handle to view a project scene or a movie on the display of the window instead of the actual surroundings. Responsive to this situation, an advertisement may then be enabled on the outside of the window. The advertisement may be served up by an ad server, an ad unit sent from a server, or an ad unit that is cached by the vehicle, autonomous vehicle or semi-autonomous vehicle memory or a mobile device's memory.

It is an aspect of the present disclosure to enable drivers and owners of vehicles, autonomous vehicles or semi-autonomous vehicles to collect monetization review associated with the views of their vehicles. A driver may receive cash, gas credits, or other items based on the number of miles driven with an ad associated with. The ads may be monetized on a CPM basis cost per impression or a cost per action (CPA) or cost per engagement (CPE) or other mechanism.

It is an aspect of the present disclosure to enable monetization based on a plurality of metrics including the size of the full display, number of impressions of the vehicles, autonomous vehicles or semi-autonomous vehicles on the road, number of advertisements displayed, type of advertisement, duration of advertisement, and location of advertisement.

It is an aspect of the present disclosure to enable discounted rates for ridesharing or autonomous vehicles that display or do not display advertisements. Various regulatory authorities may indeed block advertisements in their jurisdiction.

It is further an aspect of the present disclosure that the technology and teachings including smart windows may be used in other movable objects such as planes and trains. As an example, the windows of an airplane may be enabled to be smart connected windows that provide varying displays of different contexts, videos, movies, and scenes. Further, in yet another embodiment various windows of trains and cars may be used including the sunroof, passenger windows, and side view mirrors.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Figure 1:
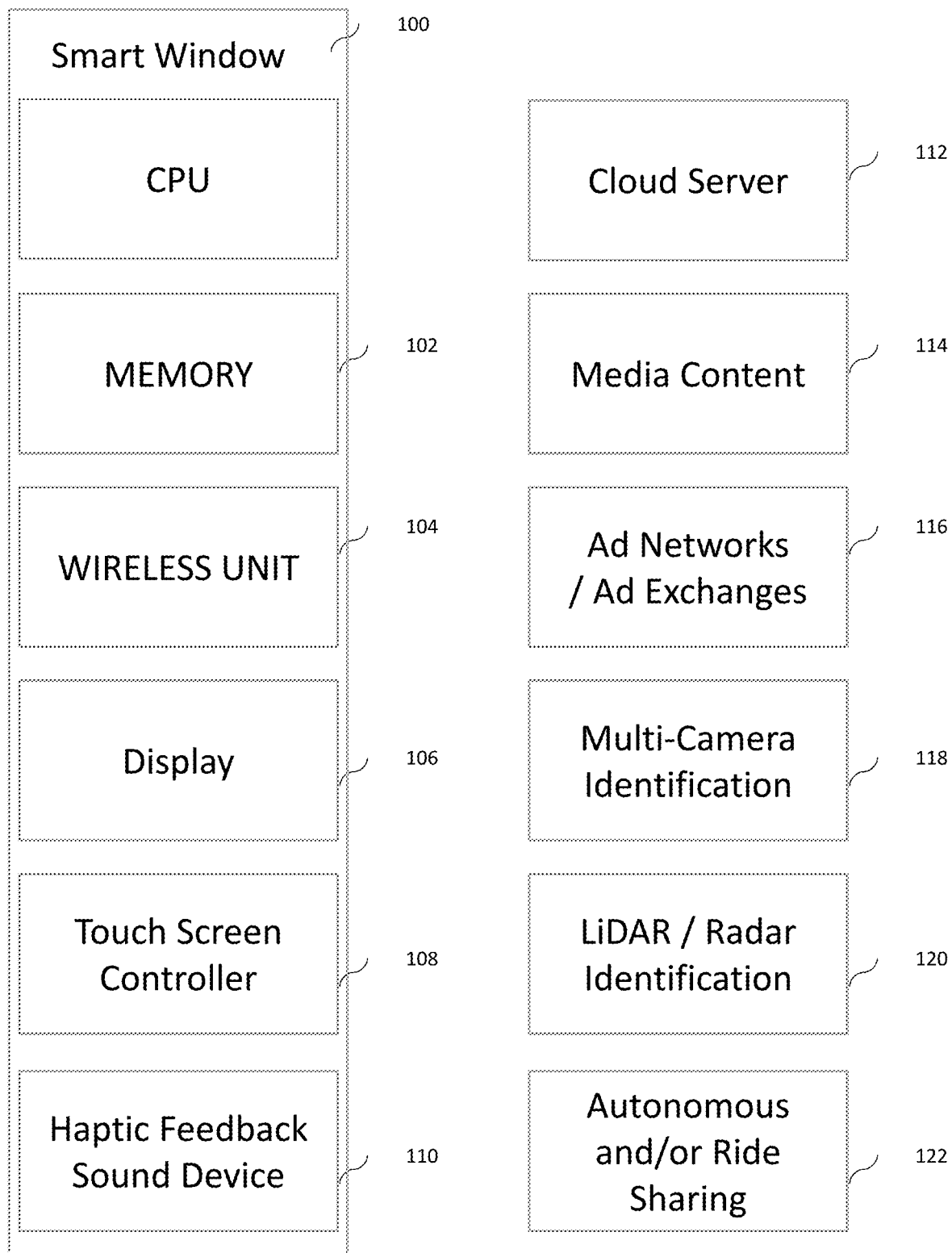
FIG. 1 depicts various modules and units of the system including a CPU, processor, and circuitry of a network connected moving vehicle, autonomous vehicle or semi-autonomous vehicle system.

Referring now to FIG. 1, FIG. 1 depicts an overall view of the system including a vehicle, autonomous vehicle or semi-autonomous vehicle with a smart window 100. A smart window system may include a display In this illustrative embodiment, the smart window device may be enabled with a housing to contain various electronics and circuitry. The housing may contain one or more CPU, Memory 102, wireless transmit and receive units, display, touch screen controllers, and haptic feedback devices. The smart window system may be enabled to directly connect to the vehicle, autonomous vehicle or semi-autonomous vehicle's wireless connectivity system or the smart window system may be enabled with wireless connectivity itself 104 or may leverage the car's central wireless connectivity system. That is the smart window may use a localized network communication protocol such as WiFi, 802.x (any variation) Bluetooth, Bluetooth LE, Zigbee, or other protocol for nearby communication to other devices.

Still referring now to FIG. 1, the smart window may connect to a cloud server(s) 112 for streaming media content 114, pictures, videos, advertisements, software updates, social networks, and other network accessible content. The vehicles, autonomous vehicles or semi-autonomous vehicles as part of this disclosure may be enabled with various multi-cameras 118 which include identification of people, vehicles, cars, and contexts. The vehicles, autonomous vehicles or semi-autonomous vehicles may further be enabled with LiDAR 120 or various radar detection. These smart windows may be enabled as part of an autonomous or ride sharing system. In these instances the smart windows may act as a security measure to display warning information to outside vehicles and passengers if there is an issue in the car. Alternatively, they may provide entertainment to the individuals with the car.

Figure 2:
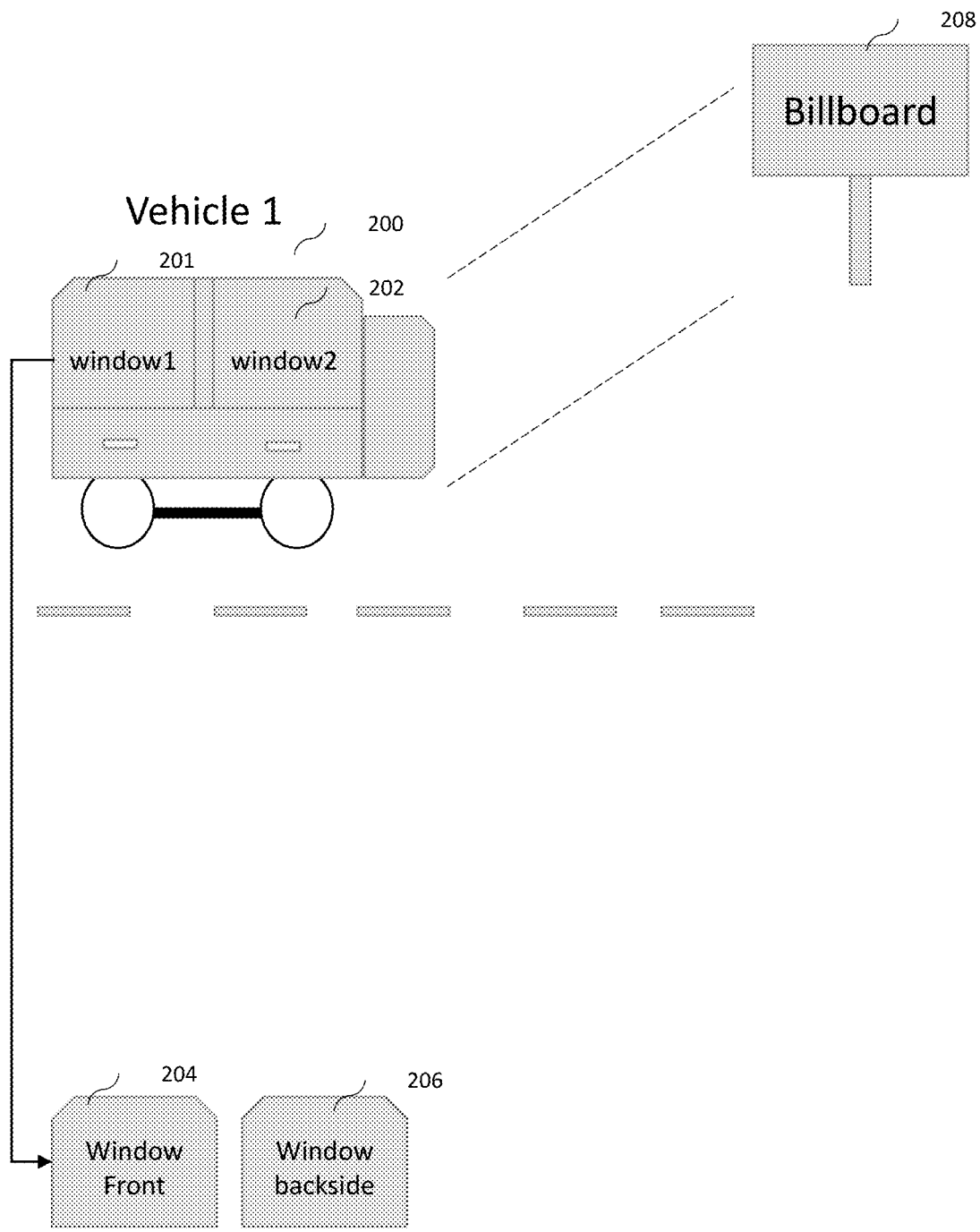
FIG. 2 depicts a network connected vehicle, autonomous vehicle or semi-autonomous vehicle with a smart window system including a first window and a second window including a first side and a second side.

Referring now to FIG. 2, FIG. 2 depicts a vehicle, autonomous vehicle or semi-autonomous vehicle 200 with a first window 201 and a second window 202. Certain windows such as the first window 201 may be enabled with a inside car facing display side 204 and a outside side/street facing side/back side 206 which faces the street. The windows may be enabled to display content on the first side of the device 204 and on the backside of the device 206 sequentially or simultaneously. The display of content may be simultaneous such that content can be targeted to the inside passenger on the inner display side 204 and on the outside display side 206 are viewing different content concurrently.

The outside display side 206 for example may display content such as video and advertisements in accordance with an ad network. The outside side may display offers of local vendors. The smart window itself may be enabled with GPS or a location based positioning service. Alternatively, the smart window may leverage the GPS location data of the vehicle, autonomous vehicle or semi-autonomous vehicle itself, one or more mobile phones in the vehicle, autonomous vehicle or semi-autonomous vehicle, location based beacons, image recognition of localized objects, or so forth.

The windows of the vehicle, autonomous vehicle or semi-autonomous vehicle may also match and redisplay those images and ad units from billboards. This process may be based on a location based system of the car in proximity to a known billboard. An ad server or ad network may further geofence certain areas for ads. An ad network may enable purchasers to buy demographics where the demographics include the type of vehicle, autonomous vehicle or semi-autonomous vehicle including make, model, and color.

Figure 3:
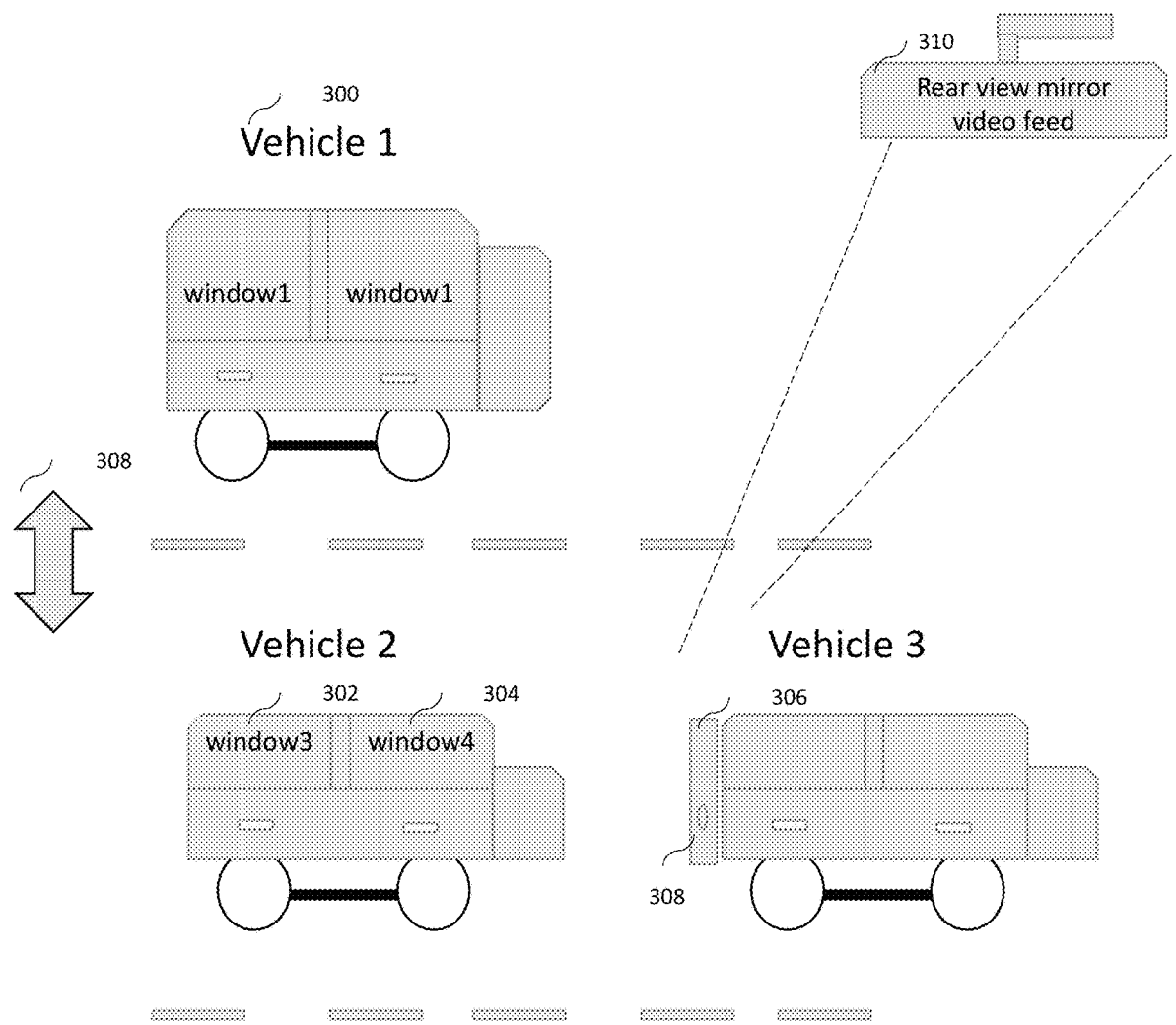
FIG. 3 depicts a vehicle, autonomous vehicle or semi-autonomous vehicle in communication with other vehicles for vehicle, autonomous vehicle or semi-autonomous vehicle to vehicle, autonomous vehicle or semi-autonomous vehicle advertising and auditing.

Referring now to FIG. 3, FIG. 3 depicts three vehicles including vehicle, autonomous vehicle or semi-autonomous vehicle 1, vehicle, autonomous vehicle or semi-autonomous vehicle 2, and vehicle, autonomous vehicle or semi-autonomous vehicle 3. Some or all of the vehicles may be enabled with one or more types of smart windows including manufacture based smart window, post market smart windows, side window smart windows, sunroof smart windows, or back panel smart windows. Vehicle, autonomous vehicle or semi-autonomous vehicle 3 for example is positioned in front of vehicle, autonomous vehicle or semi-autonomous vehicle 2 on a roadway. In this instance vehicle, autonomous vehicle or semi-autonomous vehicle 3 has a rear-view smart window 306 to allow for advertisements on the back side of the vehicle, autonomous vehicle or semi-autonomous vehicle. The advertisements may be targeted based on the profile information available about vehicle, autonomous vehicle or semi-autonomous vehicle 2. As different vehicles enter the line of sight of the advertisement of vehicle, autonomous vehicle or semi-autonomous vehicle 3, the advertisement may change. Alternatively, the advertisement may change based on the location. The determination of the car behind vehicle, autonomous vehicle or semi-autonomous vehicle 3 may be obtained via a camera that is integrated into the smart window or based on LiDAR or cameras already on vehicle, autonomous vehicle or semi-autonomous vehicle 3. Alternatively, vehicles may self select to join a discovery network or mesh network and share profile information among each other using a wireless communication protocol such as WiFi, Bluetooth, or millimeter wavelength communication.

The vehicles 300, 302, 306 can interact with smart vehicle, autonomous vehicle or semi-autonomous vehicle signs such as 308. These signs may include a radar component, digital still or video camera, or other identification components that enable digital signage to be placed on the sign and targeted to the vehicles that are approach. As an example, a car that is progressing to a local fast food diner may be identified and an advertisement may be placed on the sign temporarily replacing a speed limit sign or destination distance sign. These ad units on signs may further be relevant in the case where the sign determines that the vehicle should be communicated to with non-visual methods such as wireless transmit and receive messages may be sent between the sign 308 and a vehicle, autonomous vehicle or semi-autonomous vehicle 300.

In displaying an advertisement on the backside of the smart window of vehicle, autonomous vehicle or semi-autonomous vehicle 3 may create a lack of visibility of the vehicle, autonomous vehicle or semi-autonomous vehicle 3 driver to view the rear of the car. In this variation, one or more cameras of the smart window or of the vehicle, autonomous vehicle or semi-autonomous vehicle itself may be enabled to capture in real time the video behind the vehicle, autonomous vehicle or semi-autonomous vehicle and display the video behind the vehicle, autonomous vehicle or semi-autonomous vehicle on one or more dashboards or a rear view mirror 310. That is the rear view mirror of the vehicle, autonomous vehicle or semi-autonomous vehicle may be enabled to display not mirrored content but an actual video feed behind the vehicle, autonomous vehicle or semi-autonomous vehicle. Alternatively, the inside facing portion of the smart window itself may display a video feed of the backside of the car. In this instance, the driver of vehicle, autonomous vehicle or semi-autonomous vehicle 3 would see the roadway behind the vehicle, autonomous vehicle or semi-autonomous vehicle as a real time video feed and the outer facing portion of the smart window would still display advertisements to other passengers such as those in vehicle, autonomous vehicle or semi-autonomous vehicle 2.

Figure 4:
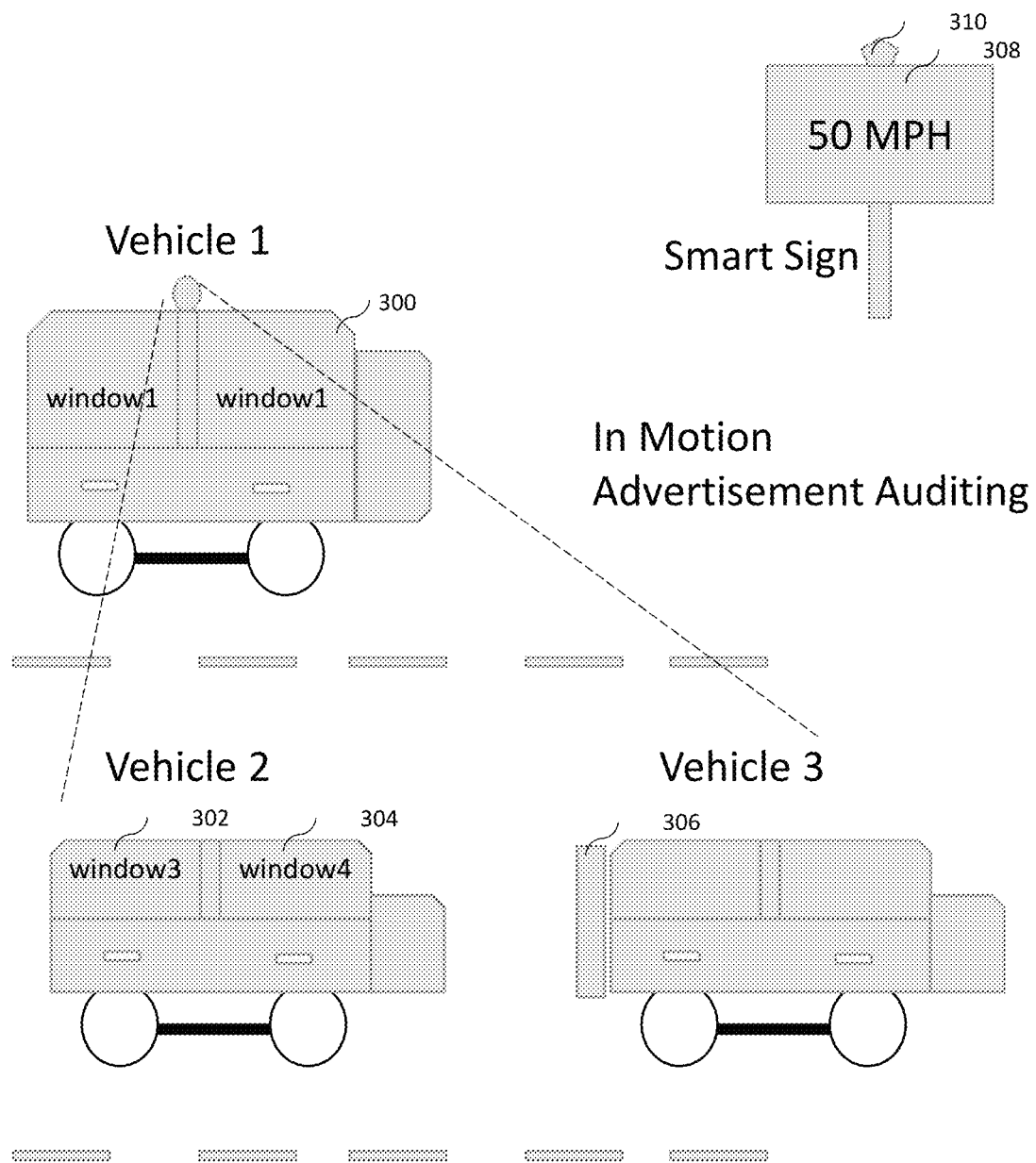
FIG. 4 depicts a vehicle, autonomous vehicle or semi-autonomous vehicle to vehicle, autonomous vehicle or semi-autonomous vehicle in motion advertising system wherein a third vehicle, autonomous vehicle or semi-autonomous vehicle functions as an auditor of the other vehicles.

Referring now to FIG. 4, FIG. 4 depicts an advertising audit system. In various instances it is important to have a basis of reporting as to the cars in proximity and the likelihood of an advertisement being displayed to passengers. In this variation, a vehicle, autonomous vehicle or semi-autonomous vehicle 1 may be used to audit the advertisements of vehicle, autonomous vehicle or semi-autonomous vehicle 3 and determine whether the advertisement was indeed shown to the passengers in vehicle, autonomous vehicle or semi-autonomous vehicle 2. Various communication flows 308 may be coordinated between the vehicle, autonomous vehicle or semi-autonomous vehicle 1, vehicle, autonomous vehicle or semi-autonomous vehicle 2, and vehicle, autonomous vehicle or semi-autonomous vehicle 3 so as to enable group advertising to all vehicles within a geofenced area.

Figure 5:
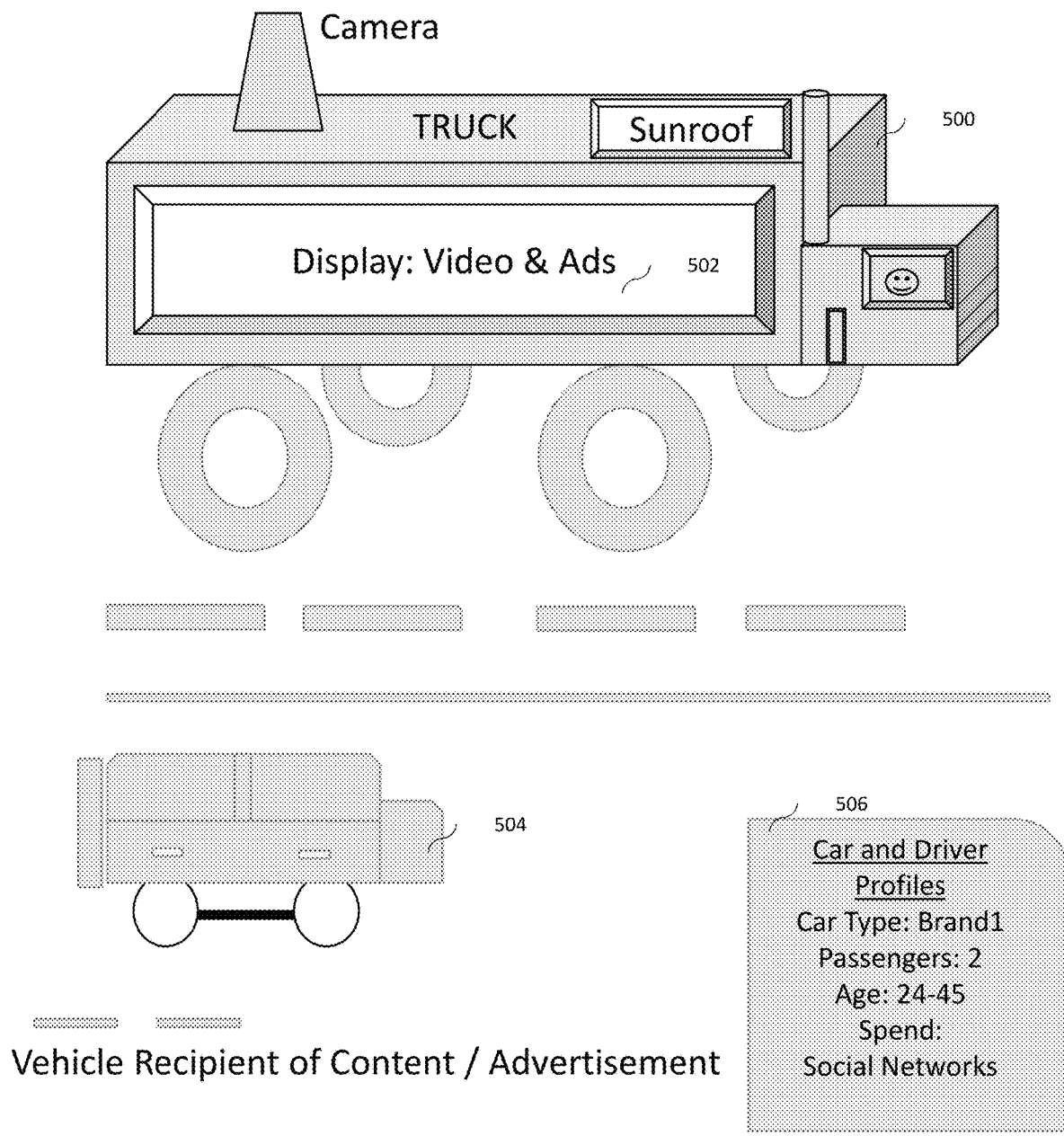
FIG. 5 depicts a large truck vehicle, autonomous vehicle or semi-autonomous vehicle with multiple digital displays for advertising on a roadway.

Referring now to FIG. 5, FIG. 5 depicts a larger vehicle, autonomous vehicle or semi-autonomous vehicle with one or more digital displays affixed to the side of the vehicle, autonomous vehicle or semi-autonomous vehicle 502. These ads may be targeted to various other vehicles on a one to one vehicle, autonomous vehicle or semi-autonomous vehicle ad to vehicle, autonomous vehicle or semi-autonomous vehicle recipient basis or based on a profile of the location or a profile of the cars or local advertisers 506. Advertisers may use ad networks, ad exchanges, or other platforms to purchase viewing impressions for passengers of vehicles. The display 502 of the truck 500 may be a digital, LED, LCD, OLED, or other display type. Advertisers may be enabled to bid on advertising space based on the vehicles of proximate vehicles 506. The interaction and reporting of how an advertisement is displayed from a first vehicle, autonomous vehicle or semi-autonomous vehicle to a second vehicle, autonomous vehicle or semi-autonomous vehicle enables targeted advertising on the roadways and further real-time reporting.

Figure 6:
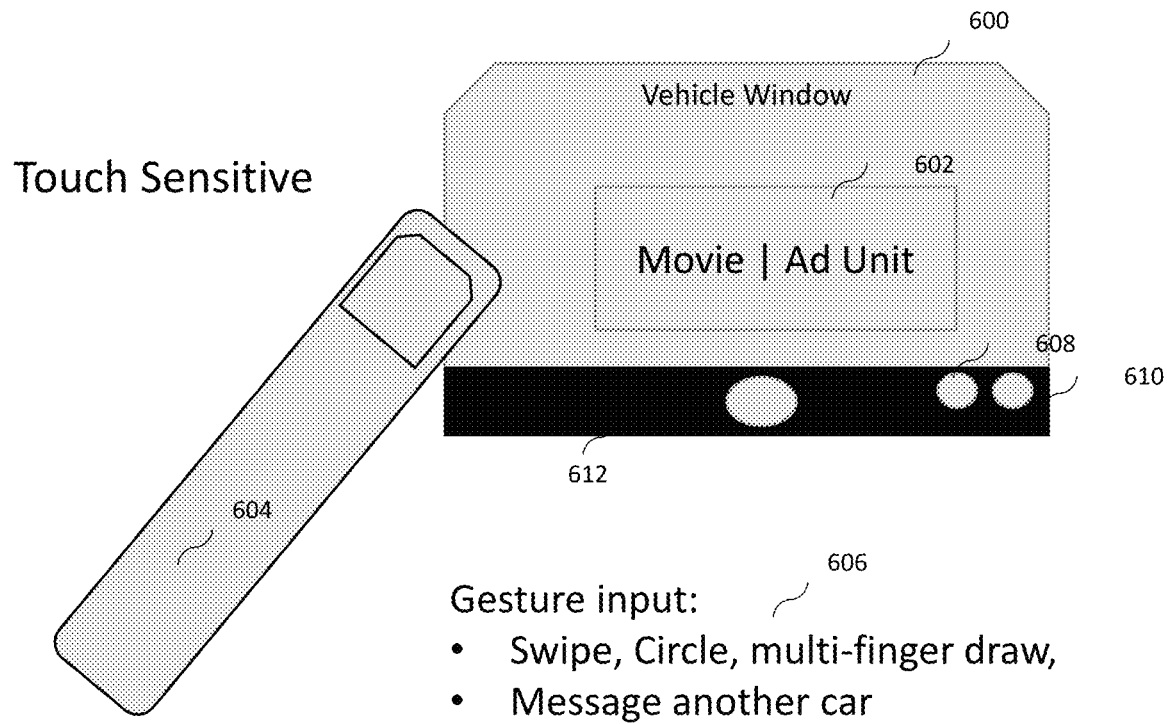
FIG. 6 depicts a touch sensitive vehicle, autonomous vehicle or semi-autonomous vehicle window capable of display multimedia content.

Referring now to FIG. 6, FIG. 6 depicts various interactions with a smart window. The smart window may be affixed onto a traditional vehicle, autonomous vehicle or semi-autonomous vehicle car window or may be affixed to a car's window via adhesives or magnets. Content may be displayed on the window in a certain region 602. As an example, a ride in a taxi on a busy street with construction may be replaced with an immersive video of driving through a forest. The smart window may hold in memory various scenes and content to enable immersive driving experiences.

The smart window 600 may be touch enabled to allow finger presses or gestures to be used to access and control a plurality of menus. The smart window itself may have an operating system, CPU, processor, memory, and wireless transmit and receive components. Many of these electronics may be integrated as a system on a chip. Gestures can be learned or programmed to the smart window. For example, a swipe left on the smart window 600 may advance the screen to the next ad unit, offer, video, music item, or content piece. A circle may indicate a distress signal and cause other nearby vehicles or local authorities to be altered. The smart window may be IP accessible and network connected. The smart window may also accept voice commands. The smart window may be enabled with a plurality of sensors including a proximity sensor, light sensor, camera 610, among others. The proximity sensor may be used to wake up the smart window display if a head is turned in the direction of the smart window. A plurality of cameras may be affixed to or integrated into the smart window to allow for image acquisition outside the vehicle, autonomous vehicle or semi-autonomous vehicle or inside the vehicle, autonomous vehicle or semi-autonomous vehicle. The base of the smart window 612 may be used to house a plurality of the electronics. Speakers may further be encased in the base 612 of the smart window. A headphone jack may also be enabled.

Figure 7:
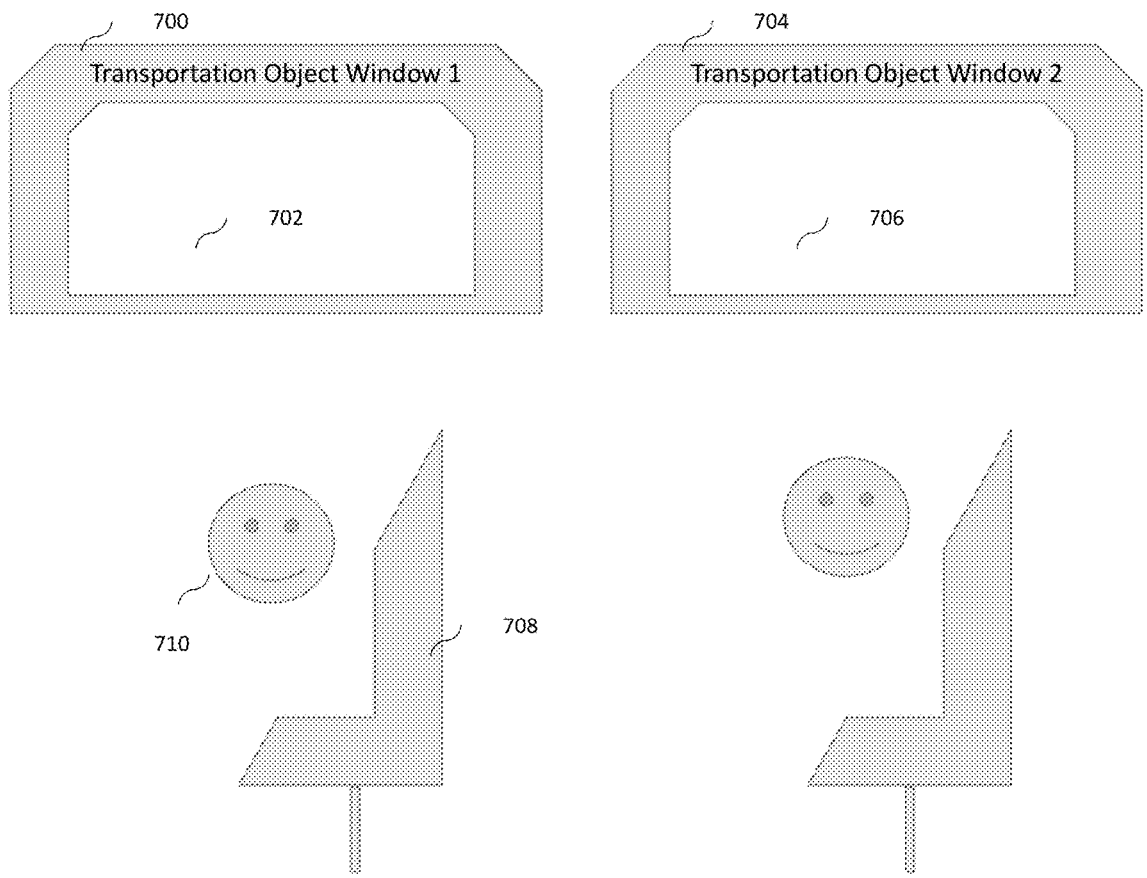
FIG. 7 depicts a moving transportation object with a plurality of smart windows enabled to display varying video content on each window screen.

Referring now to FIG. 7, FIG. 7 depicts a plurality of smart windows in an industrial as used in instances such as a bus, autonomous car, train, or plane. Various transportation objects may allow for seats 708 to be swiveled or positioned facing outward toward the window instead of facing towards the front direction of the vehicle, autonomous vehicle or semi-autonomous vehicle. In these instances users may be able to view a first smart window 700 and its display area 702. Another user may be able to view a second smart window 704 and its display area 706. The content in these instances may be different or centrally controlled. As an example, a passenger drone may be configured to display land based images so as to give the appearance that flying in the air is really travelling along a road on the ground. Lighting may also be controlled by the smart window or in unison with an internet of things connected lighting system to provide for a full immersive experience. The seats themselves 708 may be used to provide 4D motion such as a rumble or vibration to allow cinematic theater like experiences.

Figure 8:
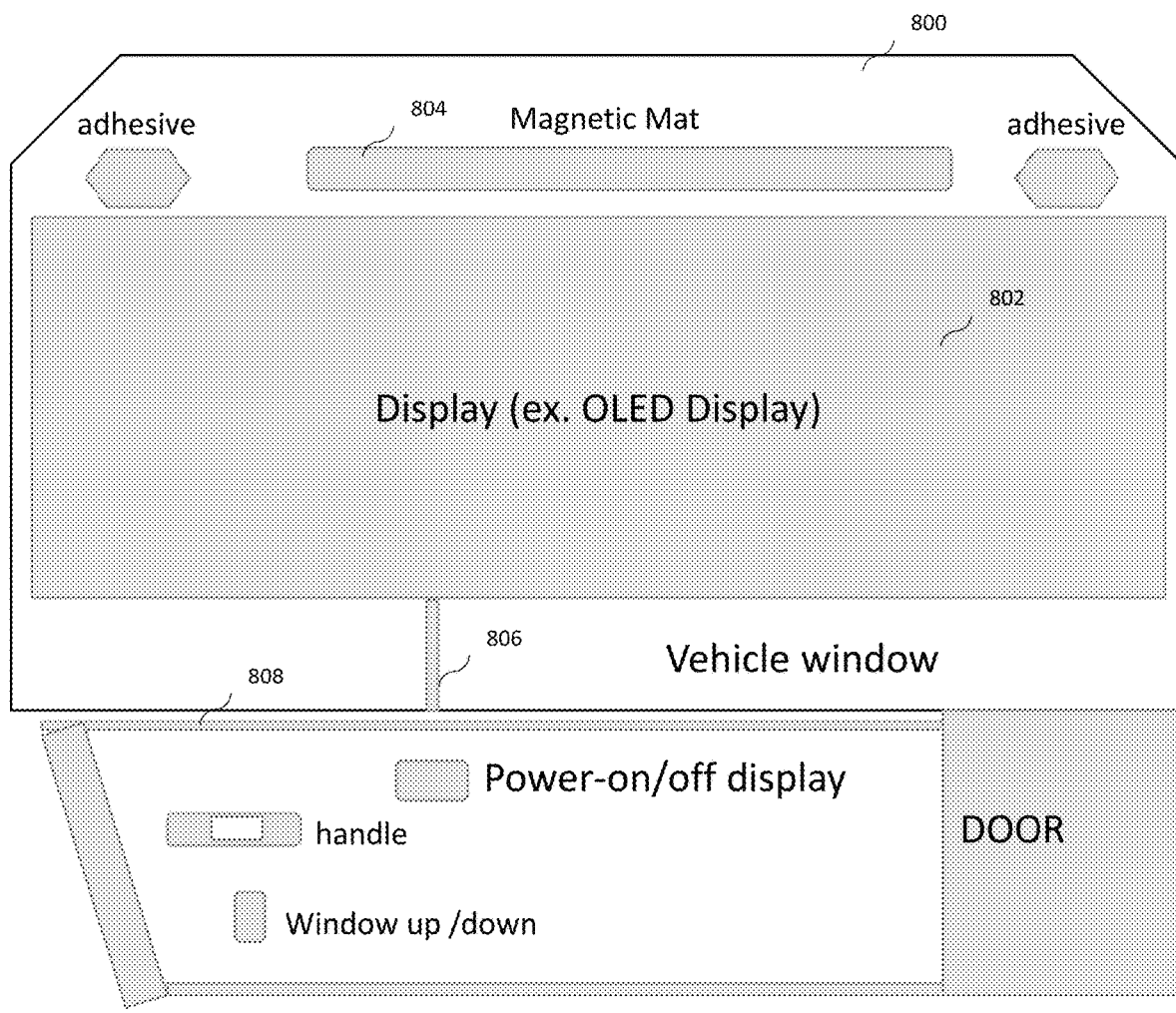
FIG. 8 depicts a car window with an OLED display capable of digital media presentation.

Referring now to FIG. 8, FIG. 8 depicts a smart window affixed to a window of a vehicle, autonomous vehicle or semi-autonomous vehicle. A display 802 may be OLED, LCD, LED, or another format. An OLED display may be expensive but more applicable for certain vehicles due to its extremely thin profile. Various magnets may be used 804 or adhesives to affix the smart window to the window of the car. A hardwire 806 may connect the display to an electronics base.

Referring now to FIG. 8, FIG. 8 depicts a smart window affixed to the window of a vehicle, autonomous vehicle or semi-autonomous vehicle. A vehicle, autonomous vehicle or semi-autonomous vehicle may be enabled with one or more smart windows. The smart windows may be enabled with a media capability to display pictures and video. Audio may be integrated into a panel below the smart window or within the housing of the smart window. In yet another embodiment, the smart window may be touch enabled or voice responsive. The smart window may include electronics such as a CPU, GPU, memory, wireless connectivity unit, and further electronics. These electronics may be located with the door of a vehicle, autonomous vehicle or semi-autonomous vehicle or another part of the vehicle, autonomous vehicle or semi-autonomous vehicle or as a base 808.

Figure 9:
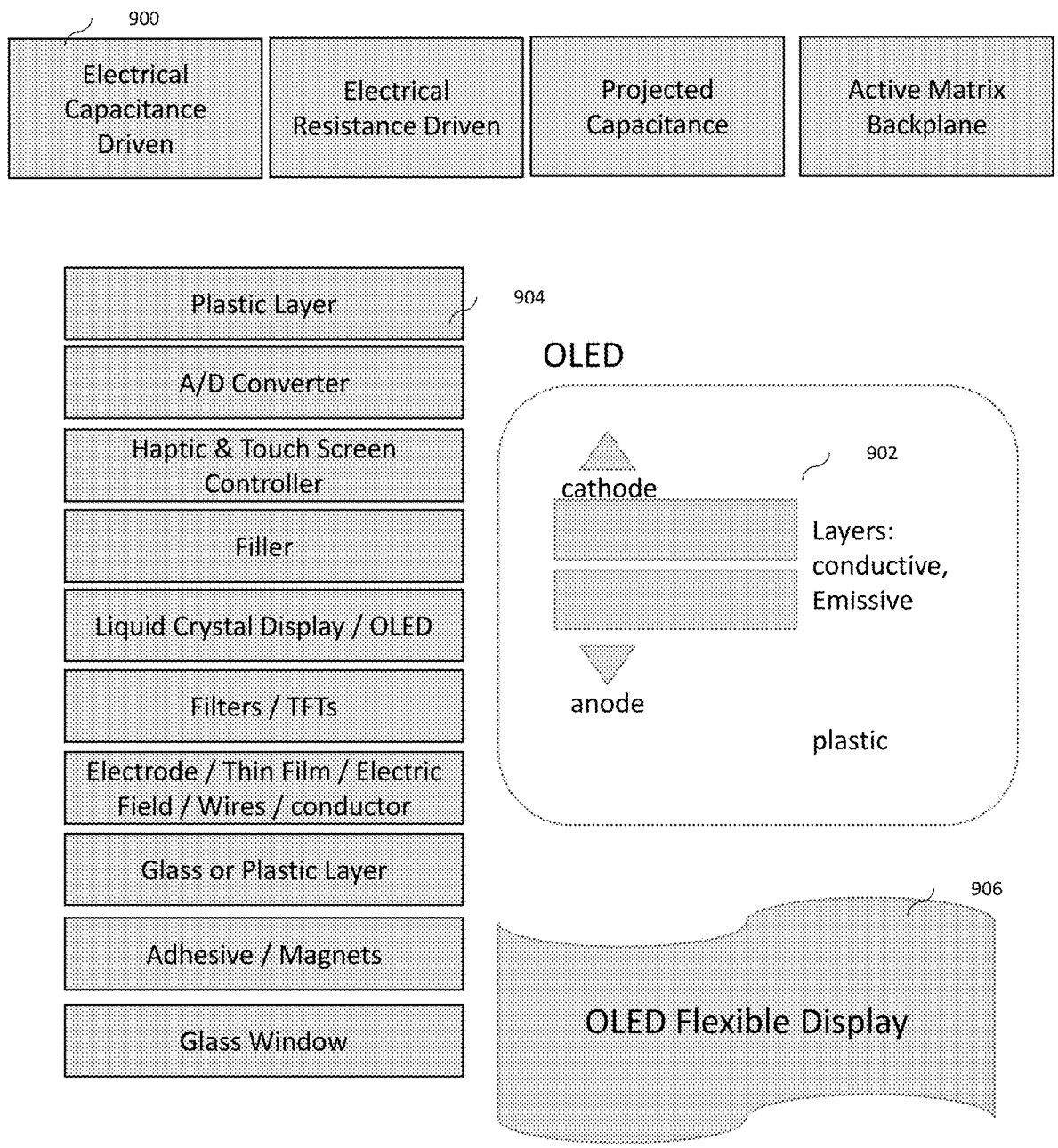
FIG. 9 depicts various aspects of an touch screen display including converters and filters.

Referring now to FIG. 9, FIG. 9 depicts various components of a display and a touch screen interface for use in the smart window. Various touch screen approach may be used 900 including electrical capacitance driven, electrical resistance driven, projected capacitance, or other sorts. The displays may be enabled with an active matrix backplane and backlight. Certain display types will not need this. The display may have various layers 902 and cathode and anode to allow for the movement of organic molecules. The layers 904 may be doubled up in certain cases. The smart glass housing may itself be plastic, glass or another material. An analog to digital converter may be used. The smart window may be touch enabled or non-touch enabled. In touch enabled scenario, a touch screen controller or haptic controller may be integrated into the components. A filler may be used in the screen, various filters, and conductors. The smart window may be connected to glass or the car glass window itself via adhesive, magnets, electric fields, magnetic fields. Various types of displays maybe used including Organic Light Emitting Diode (OLED) and those that are flexible in nature. OLED displays may for example be highly think in structure and separate the display from the electronics needed to power the display by either wired or wireless means. That is the processing may be split from the display by a greater distance so as to enable a thin form factor. Various wired connections such as HDMI, USB-c, ethernet, VGA, or other cords may be used to connect the display to the electronics.

Figure 10:
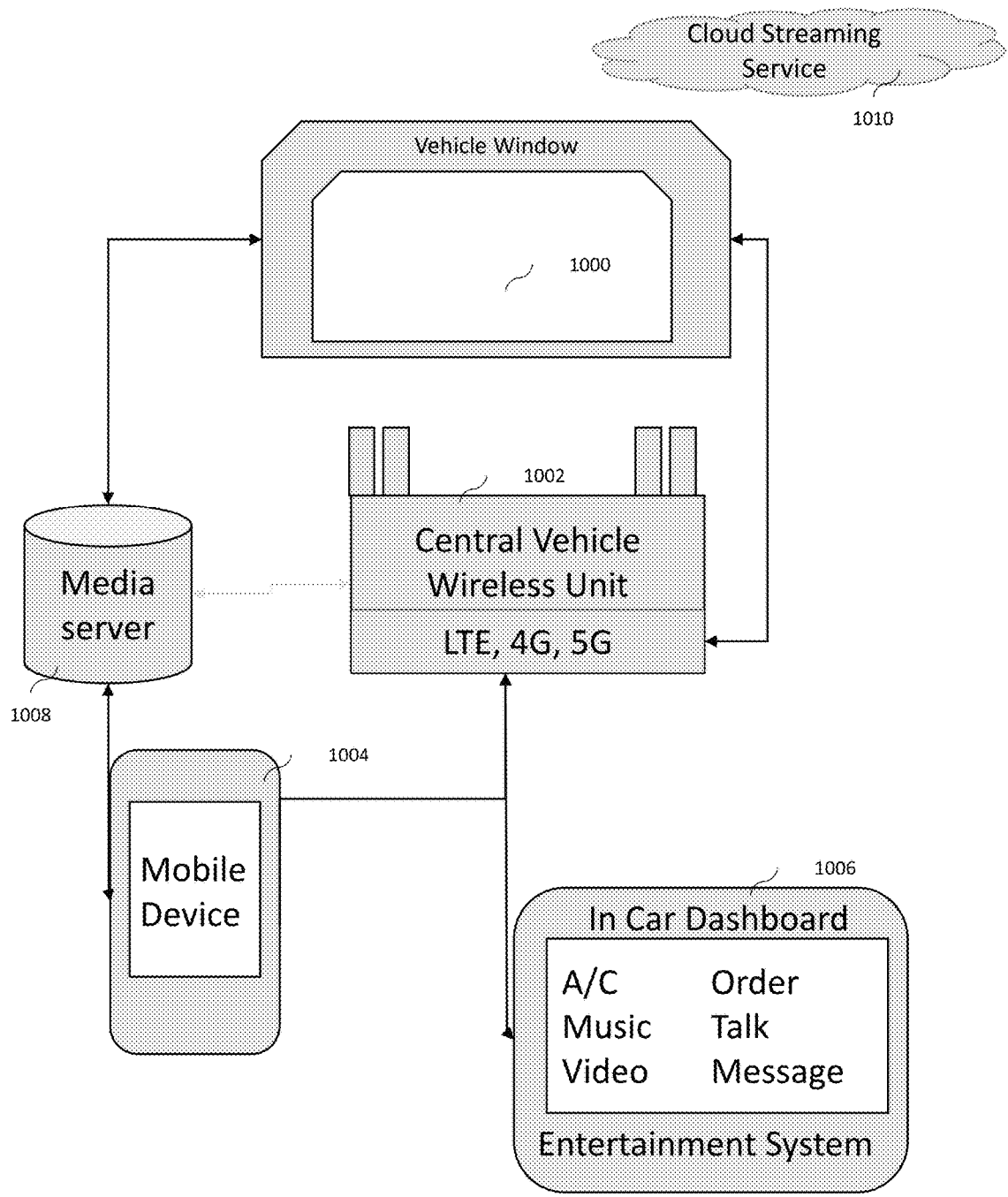
FIG. 10 depicts an architecture of connectivity between a vehicle, autonomous vehicle or semi-autonomous vehicle connectivity radio, in car entertainment and control dashboard, mobile device, media server, and smart window.

Referring now to FIG. 10, FIG. 10 depicts various networking and communication between the smart windows, mobile devices, car central wireless communication, and the in-car dashboard. The smart window 1000 may be enabled to connect to a central vehicle, autonomous vehicle or semi-autonomous vehicle wireless unit 1002 via Bluetooth, Zigbee, Wi-Fi, or other wireless protocol. The central wireless unit may serve as a gateway, router, switch, and coordinate communication between all the devices within the vehicle, autonomous vehicle or semi-autonomous vehicle and those outside on the Internet or other network. The plurality of mobile devices may connect to each other or the vehicle, autonomous vehicle or semi-autonomous vehicle central unit via a mesh network, Wi-Fi Direct, or other protocol. These devices may further pool their network connectivity and bandwidth. The car dashboard 1006 may be used to control content on the smart window 1000. A mobile device 1004 may also be used to control the content. The smart window itself 1000 may have menus to control content.

Figure 11:
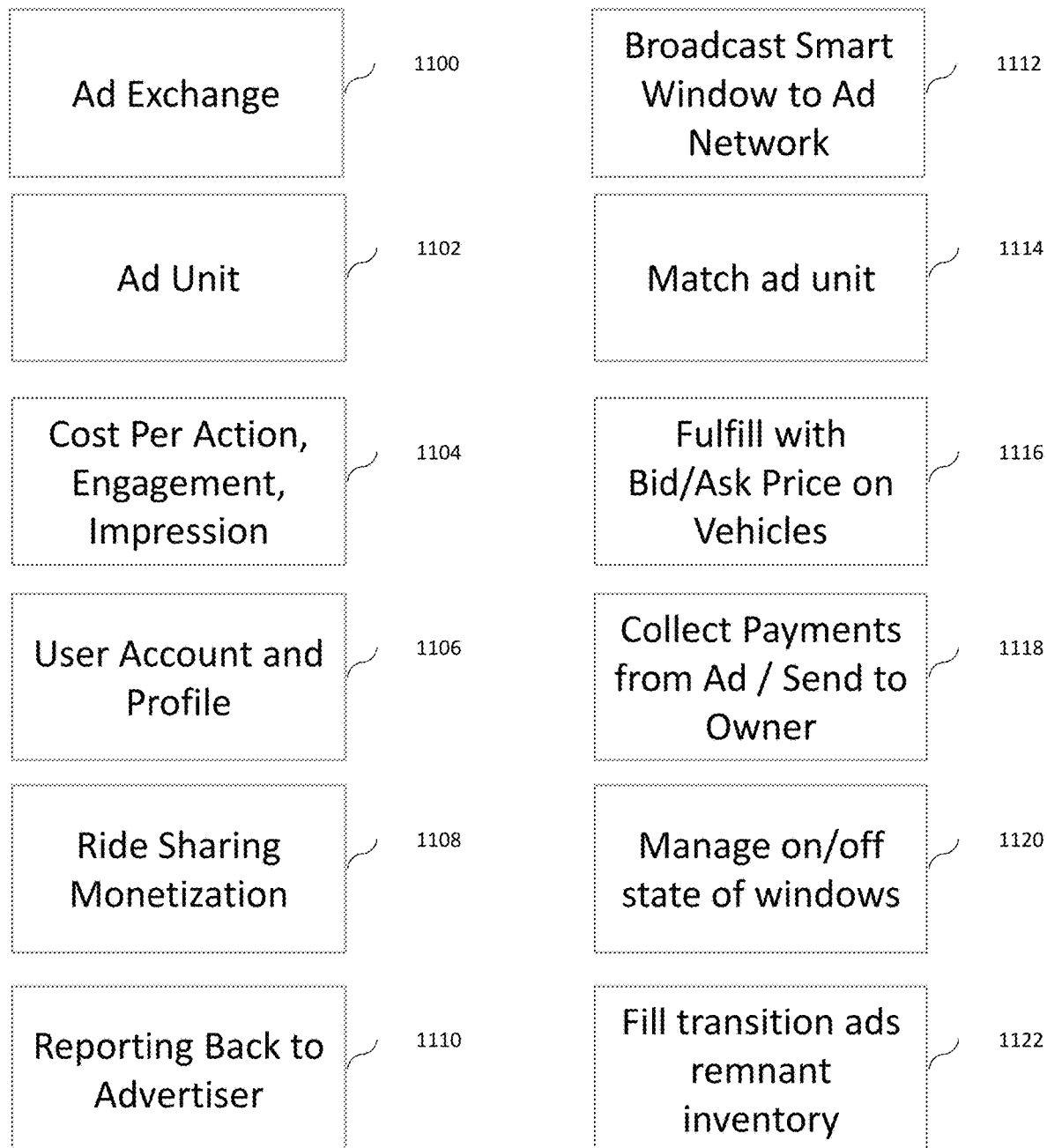
FIG. 11 depicts various monetization aspects of the vehicle, autonomous vehicle or semi-autonomous vehicle advertising network.

Referring now to FIG. 11, FIG. 11 depicts various advertising monetization systems which may be integrated at the server or smart window level or a combination of both. These systems can enable buyers to purchase display time, ad units, or engagements for various vehicles. Various personalized and customized ad units 1102 may be served by an ad exchange 1100 or ad network. The system may enable a cost per action or impression 1104. In various instances, a user account with demographic, personality, and driving behaviors may be created 1106. The user account and profile may grow and evolve over time 1106. The advertising systems may authenticate to one or more ride sharing and monetization platforms 1108. The ad networks or exchanges 1100 may enable reporting back to the brands and advertisers and also to the drivers 1110.

The broadcast of content from one smart window of a first vehicle, autonomous vehicle or semi-autonomous vehicle may also be sent to the mobile devices or vice versa. It could also be sent from the vehicle, autonomous vehicle or semi-autonomous vehicle to another vehicle, autonomous vehicle or semi-autonomous vehicle. The brand units may be matched 1114 based on a cost per impression or cost per engagement based on user profile information 1106. A marketplace may enable bid and ask prices to be placed on vehicles 1116. A monetization server may collect payments from the advertiser and send payments to the user's account or a ridesharing account. As an example a ride sharing program may allow a passenger to enable ads on the window of the car during their trip to defray the cost of the trip. The payments in this instance may then be credited against any cost to the driver of the vehicle, autonomous vehicle or semi-autonomous vehicle 1118. The state management of the windows 1120 may be governed by a local hierarchy, by an application on a mobile device, or by a configuration software program in a processing and electronics system of the vehicle, autonomous vehicle or semi-autonomous vehicle and accessible via the dashboard. In various instances, the software may be implemented in a form of instructions accessible in a computer readable medium and stored in the memory of a local or network device. It is further an aspect of the system to enable advertisements to be cached and stored locally or on the network to allow for transition advertisements.

In particular a real time advertising exchange may be enabled to capture a predicted customer based on the trajectory of their path. Additionally, vendors such as restaurants may place bids based on a time of the day. Certain vehicles, autonomous vehicles or semi-autonomous vehicles may be associated with more often consumption at a particular type of restaurant or fast food chain. Various remnant or a mix of engagement ads and impression ads may be enabled 1122.

Figure 12:
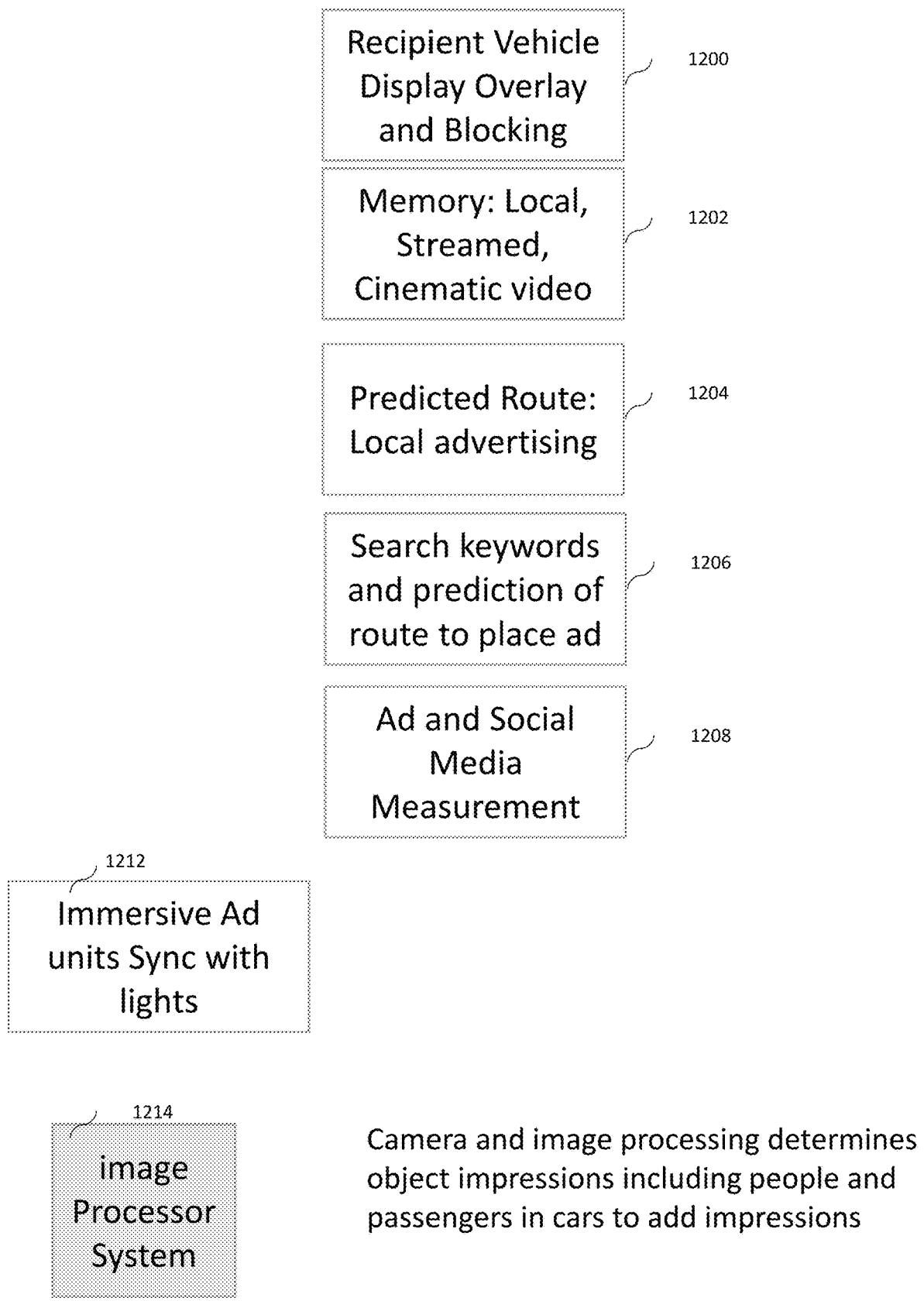
FIG. 12 depicts synchronization of the smart vehicle, autonomous vehicle or semi-autonomous vehicle window with lighting and other subsystems of the vehicle, autonomous vehicle or semi-autonomous vehicle.

Referring now to FIG. 12, FIG. 12 depicts various components of an ad system in communication with other devices including local and global ad networks, media servers, and streaming services. Further, the device may be enabled with various image processors to allow for object impressions including people and passengers to be identified and advertised against. Cameras on the smart window or in the car may identify objects and targets for advertisements.

A software subsystem may control the hardware of the smart window display to turn on or off the display based the presence of an advertisement, roadway interaction or municipality regulation 1200. The control function may be processed by a local or network processor in conjunction with multiple wireless transmit and receive components. The control function may manage windows on/off and display settings. The control function may be influenced by location based services, RFID on freeways, Radar towers, intelligent signs, and other physical hardware systems. The smart windows may be enabled to display media content 1202 that is cached and stored in memory. The allocation of ads to various memory units may be based on a predicted transit route 1204. The predicted route may be based on an observed trajectory of the vehicle, autonomous vehicle or semi-autonomous vehicle on a roadway, a maps server, a navigation system, a image processor and image recognition of the vehicle, autonomous vehicle or semi-autonomous vehicle 1214, or other mechanism. The image processor system 1214 may be enabled on the smart window itself, on the top of a vehicle, autonomous vehicle or semi-autonomous vehicle, in a roadway sign or structure, or from a aerial drone. These image recognition systems are enabled to provide reporting of vehicle, autonomous vehicle or semi-autonomous vehicle types to ad servers and ad networks and to report on the types of advertisements that are indeed displayed. Certain ad units may be immersive ad units 1212 if the vehicle, autonomous vehicle or semi-autonomous vehicle is enabled with the capability. In this variation, a control message from a vehicle, autonomous vehicle or semi-autonomous vehicle may enable a vehicle, autonomous vehicle or semi-autonomous vehicle to display immersive ad units such that lights may be turned on or off or other visual cues may be enabled in conjunction with the video.

Various control mechanisms may be embedded in the smart window or in a central vehicle, autonomous vehicle or semi-autonomous vehicle processing unit. That is a touch screen system in the central dashboard of a vehicle, autonomous vehicle or semi-autonomous vehicle may control various functions of the smart windows or the smart windows themselves. The smart windows may receive streamed media 1202 via signals from the vehicles central wireless transmit and receive unit.

It is an aspect of the present disclosure to enable dynamic real-time purchasing of advertisements or instead a specific time of advertisement purchase. For example, an ad buy may purchase an entire geofenced area, a certain make and model of the vehicle, autonomous vehicle or semi-autonomous vehicle, or a specific window.

In various embodiments, both hardware and software may be used to enabled the services as described herein. A smart window may include a processor, memory, wireless transmit and receive unit. In certain variations, these components may be one system on a chip. The car itself may be in communication with the smart window or mobile devices. That is a first processor may exist in the smart window and a second processor may be in the car. A first wireless signal may be transmitted and received from the smart window to the car processor.

In some variations, a profile configuration tool may be used to establish a user's profile and vehicle, autonomous vehicle or semi-autonomous vehicle profile. This in onboarding process may allow a vehicle, autonomous vehicle or semi-autonomous vehicle to setup a monetization account to receive payments and revenue from the ad payment system. Additionally, the monetization system may enable a user to pay for a subscription video and media service for their car and smart windows.

The use of the word vehicle, autonomous vehicle, or semi-autonomous vehicle is not intended to be limiting. The vehicle may be human driven. The vehicle may be fully autonomous. The vehicle may be semi-autonomous. Various combinations of these may also exist for each vehicle. Or the vehicle may just include one of the settings.

In other instances, the vehicle may have various levels of autonomy such as levels 1 to 5 ranging from some systems being automated, to multiple systems being automated, to self driving of certain aspects such as automatic breaking, to fully autonomous without a user being involved in the specific aspects of the driving.

The vehicle is not limited to surface level vehicles. Vehicle is intended to cover other mobility focused devices such a flying car with as a vertical take-off and landing (VTOL) device, flying taxi service, or a hybrid of a plane and a car.

In various instances, windows is used however the disclosure is also applicable to the windshield or sunroof or moonroof or side mirrors or rear-view mirrors.

Touch Screen and Display Interaction

The material used for a touch screen display on the window and a display system is not intended to be limiting in this disclosure. In one non-limiting example, an OLED screen may be used. In a different example, a multi-layer film may be used. In these varied instances, the opacity and translucency of the films may vary.

In various instances, an exchange or application store may be provided by a third party, the vehicle manufacturer, or mobile device service to purchase content to place on the screens of the vehicles.

In various examples, the vehicles may include electric vehicles, plug-in hybrid cars, connected cars, ride sharing service cars, leased cars from dealers, joint-ownership cars, pay-by-the mile ride sharing vehicles among others.

In one instance a server or a plurality of servers may be provided that store content environments for the vehicles. These content environments may be available for purchase through an application store or content store. The environments may also be sponsored by an ad network, advertisers, brand, restaurants, and other third parties.

In addition, a digital rights management (DRM) system may be enabled with a cloud based server or content store to allow users of the car to purchase immersive movies for the panorama rooftop. These content files may be sent from a remote server to a local server on a mobile device within the vehicle or within an exchange is enabled for immersive cinematic experiences.

In one or more instances one or more cameras within the vehicle is enabled to capture users gestures and interaction. In these instances, the gestures within the vehicle by a user may be enabled to change the inside displays of the car. As an example, a user who makes a swiping motion may be detected by an image recognition program running within the vehicle executed by a local in vehicle processor or a processor coupled to the smart window.

Fully and Semi Autonomous Vehicle Screen Changes

In some examples, the vehicle when only in a fully autonomous mode is enabled to change the inside display screens including the windshield to include content such that the roadway is not visible and instead the content alone is visible. At least one processor on board the vehicle is enabled to detect when the vehicle is in autonomous mode. In these situations, the vehicle is enabled to active fully immersive content on windows or screens including the front windshield which would normally block the view of a driver, but given that the vehicle is self-driving, the blocked view would not impede the driving of the vehicle. In these situations immersive content may be enabled for both the front side of the windows and windshield.

Alternatively, in this autonomous mode, the car front screen, side screens, and rooftop or one or more of the aforementioned or combinations thereof may be turned completely opaque. In these instances the advertisements, video content, and other directions may be displayed for one or more users inside the car.

In some examples, in autonomous mode, the vehicle may serve as a safety and precaution through the use of its screens to project or display content outside the vehicle. The vehicle may use screens on the car to light up the outside of the car windows with various hues, tints, or alternating colors. As an example, in a dark night, the car may light up the windows in the side mirrors, side mirrors, or windshield with a bright transparent or translucent color or content, to provide more light to the cameras, LiDAR and sensors to acquire content. In other self-driving autonomous modes, the car may use a series of outside indication messages in the event of a potential collision with a car, object, pedestrian, or other item. These messages may be coupled with pre-set audio commands.

These changes to the display may be responsive to indications from sensors that a potential collision or negative impact may occur. In one instance a camera may detect an potential object that the autonomous vehicle may collide with. In addition to lighting the front display, the outside or street facing side of the front display may give a message such as "Run Right!" or "Run Left" to the individual. Alternatively, the mere bright lights of the vehicle may alert the presence of the vehicle to a pedestrian or other car. The outer displays may therefore be used as part of a collision avoidance system. The outer displays may also be configurable to be display pattern which includes flashing sequences.

The collision avoidance system of the present disclosure is further enabled to make the vehicle move into a "wake-up" mode in which the windshield turns clear and a side windows or a combination of these items displays bright screens to wake up the users in the autonomous vehicle.

In various instances the smart window system disclosed herein may be enabled to connect to the vehicle On-Board Diagnostics (OBD) port including OBD I or OBD II or any variant to enable information to flow between the smart window and the vehicle.

In various instances an augmented reality system may be enabled such that a camera may obtain content outside the vehicle and correspondingly alter the content and display it on the inside window.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A system comprising:
   an electronic device, wherein the electronic device is configured to be positioned on a vehicle; the electronic device comprising a processor, a memory, a first display, a second display, a proximity sensor, a camera; and a wireless transmit and receive unit enabled for communication of one or more content with a server;
   wherein at least one of the one or more content comprises of an advertisement;
   the camera of the electronic device configured to acquire a live view outside the vehicle, and the electronic device configured to display a rendering of the live view on the first display of the electronic device; wherein the first display faces the inside of the vehicle;
   the second display of the electronic device configured to be on the reverse side of the first display; wherein the second display is enabled to display the advertisement based at least upon a location of the electronic device; and
   the proximity sensor configured to wake up at least one the first display and the second display of the electronic device upon a detection of an object facing the direction of either the first display or the second display.

2. The system of claim 1, wherein the advertisement is determined at least in part by an ad exchange.

3. The system of claim 1, wherein the advertisement is targeted based at least in part on one or more objects identified from one or more captured images by the camera of the electronic device.

4. The system of claim 1, wherein the advertisement is personalized to a vendor located in proximity to the electronic device as determined at least in part by the location of the electronic device.

5. The system of claim 1, wherein the advertisement is associated with a dynamic real-time purchase of the advertisement based at least in part on a geofenced area associated with the electronic device.

6. The system of claim 1, wherein the advertisement is personalized based on one or more proximate vehicles to the electronic device.

7. The system of claim 1, wherein the advertisement is restricted to a geo-fenced area.

8. The system of claim 1, wherein the advertisement is customized based on a predicted trajectory of the electronic device.

9. The system of claim 1, wherein a payment from an advertiser in association with the advertisement is obtained by one or more servers.

10. The system of claim 1, wherein the one or more content of the electronic device covers a window of the vehicle.

11. A method comprising:
providing an electronic device for placement on a window of a vehicle; wherein the electronic device comprises a processor, a memory, a first display, a second display a proximity sensor, a camera; and a wireless transmit and receive unit configured to receive from a server one or more content;
wherein the camera of the electronic device is configured to acquire a live view outside the vehicle, and the electronic device is configured to display a rendering of the live view on the first display, wherein the first display faces the inside of the vehicle;
configuring by the processor at least one of the one or more content on the second display of the electronic device to be viewable on the outside of the vehicle;
wherein at least one of the one or more content comprises of an advertisement;
wherein the second display of the electronic device is configured to face the reverse side of the first display;
wherein the second display is enabled to display at least one of the one or more content including the advertisement;
wherein the server determines the advertisement based at least on a location of the electronic device; and
configuring the proximity sensor to wake up at least one of the first display and the second display of the electronic device upon a detection of a head facing the direction of the first display or the second display.

12. The method of claim 11, wherein the advertisement is targeted based at least in part on one or more objects that are identified from one or more captured images by the camera of the electronic device.

13. The method of claim 11, wherein the advertisement is personalized to a vendor located in proximity to the electronic device as determined at least in part by the location of the electronic device.

14. The method of claim 11, wherein the electronic device is enabled to automatically dim and adjust the brightness of the display or the second display.

\* \* \* \* \*